United States Patent [19]

Papastavros

[11] Patent Number: 4,894,984
[45] Date of Patent: Jan. 23, 1990

[54] TURBINE SYSTEMS WHICH OPERATE FROM THE EXHAUST HEAT ENERGY OF GAS OR STEAM TURBINE POWER PLANTS

[76] Inventor: Demos Papastavros, 2429 NE. 184th Ter., N. Miami Beach, Fla. 33160

[21] Appl. No.: 150,636

[22] Filed: Feb. 1, 1988

[51] Int. Cl.$^4$ ............................................. F02C 6/18
[52] U.S. Cl. ................................. 60/39.17; 60/39.181; 60/39.182
[58] Field of Search ............. 60/39.181, 39.182, 39.17, 60/39.52, 650, 651, 655

[56] References Cited

U.S. PATENT DOCUMENTS

| | | | |
|---|---|---|---|
| 3,007,306 | 11/1961 | Martin et al. | 60/39.181 |
| 3,159,970 | 12/1964 | Spillmann | 60/39.181 |
| 3,374,621 | 3/1968 | Pacault et al. | 60/39.181 |
| 3,436,911 | 4/1969 | Squires | 60/39.181 |
| 3,436,912 | 4/1969 | Squires | 60/39.181 |
| 4,184,325 | 1/1980 | Mandrin | 60/39.181 |
| 4,267,692 | 5/1981 | Earnest | 60/39.181 |
| 4,378,678 | 4/1983 | Papastavros | 60/655 |
| 4,502,277 | 3/1985 | Papastavros | 60/39.181 |

FOREIGN PATENT DOCUMENTS

| | | | |
|---|---|---|---|
| 481097 | 3/1938 | United Kingdom | 60/39.181 |
| 645671 | 11/1950 | United Kingdom | 60/39.181 |

Primary Examiner—Donald E. Stout

[57] ABSTRACT

The claimed engine is a gas turbine power plant having a conventional gas turbine system, a medium power plant system and a low power plant closed loop system. The turbines used in the medium and low power plant systems are designed to allow a heat exchange relationship between the aforementioned turbines and another part of the system. A heater, using an external energy source, provides heat energy to drive the conventional gas turbine system. The hot exhaust fluid of the gas turbine flows through a conduit where it gives up heat energy, through a heat exchange relationship, to the turbines of the medium power plant system, therefore providing the heat energy to drive those turbines. The exhaust fluid of the gas turbine having given up most of its heat energy, is released into the environment. The hot exhaust fluid of the turbines of the medium power plant system and the hot exhaust fluid of the turbines of the low power plant closed loop system give up heat energy, through a heat exchange relationship, to the working fluid in the closed loop cycle of the low power plant closed loop system, therefore providing the heat energy to drive the turbines of the low power plant closed loop system.

8 Claims, 5 Drawing Sheets

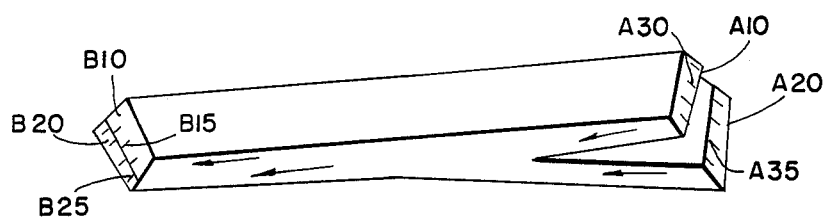
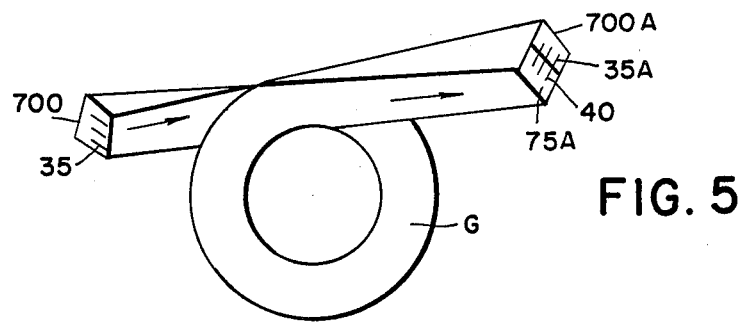
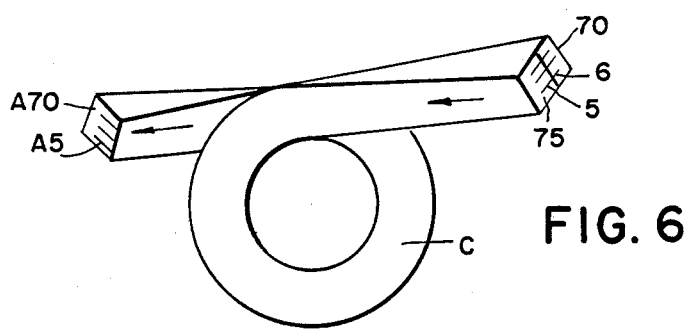
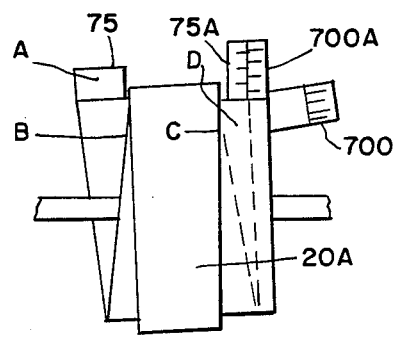
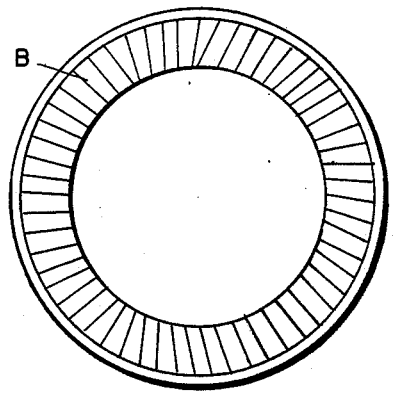
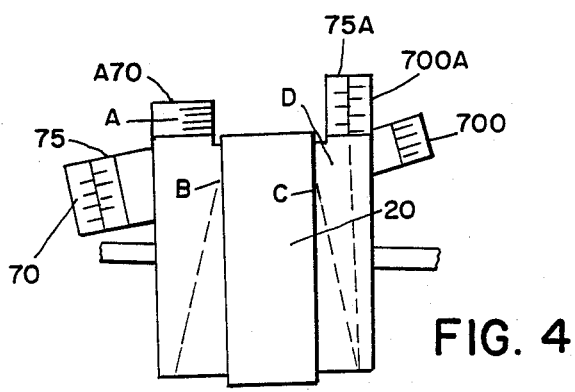

TURBINE SYSTEMS WHICH OPERATE FROM THE EXHAUST HEAT ENERGY OF GAS OR STEAM TURBINE POWER PLANTS

SUMMARY OF THE INVENTION

The four turbine power plants in this invention have similar characteristics as those in U.S. Pat. Nos. 4,378,678 (Turbine System), 4,502,277 (Turbine Power Plant System), 4,420,941 (Cooling System) and application Ser. No. 07/000,148 (Turbine Power Plant and Exhaust Turbine Systems). If desired, the turbines used in the medium and low power plant systems of this invention may be used in each of those systems in closed loop or open loop cycles.

A principal objective of these power plants is to provide a novel energy producing system having gas turbines or steam turbines, a plurality of N turbines (where N is a whole number greater than one) of medium and low power plant systems, heaters condensers and pumps arranged in a novel manner to improve the recycling of exhaust heat energy, improve efficiency and minimize energy consumption.

Another objective of these power plants is to provide novel energy producing systems which allow a heat exchange relationship between two or more open or closed loop cycles. A gas or steam turbine allows its exhaust heat energy to be transferred through a heat exchange relationship to the plurality of N turbines of the medium power plant systems whose turbines in turn allow their exhaust heat energy to be transferred through a heat exchange relationship to the plurality of N turbines of the low power plant systems. The medium and or low power plant systems may be modified to be connected to any conventional turbine system and may be modified to use any heat source for the production of energy.

A further objective of these power plants is to provide systems in which the turbine blades of the turbines of the medium and low power plant systems are set at an angle in the rotor passageway which allows them to pull in working fluid at the turbine inlet and push out working fluid at the turbine outlet.

A further objective of these power plants is to provide systems in which a pressure drop occurs at the outlet of each of turbines of the medium and or low power plant systems as exhaust heat energy is transferred through a heat exchange relation to the cool working fluid flowing from the pump to the heater of each turbine power plant.

Another objective of these power plants is to provide systems in which each of the plurality of N turbines of the medium and low power plant system is designed to have a fluid conduit which passes outside the rotor blades "tapering in" (decreasing in size) at the turbine inlet and "tapering out" (increasing in size) at the turbine outlet. Each of the turbines is designed to allow the working fluid to enter the blades continuously and leave the blades continuously as the working fluid flows from the turbine inlet to the turbine outlet.

Further objectives and advantages of these turbine power plants will be apparent from the following detailed description of a presently preferred embodiment, which is shown schematically in the accompanying drawings.

DESCRIPTION OF THE DRAWINGS

FIG. 4 shows schematically a side view of the turbines used in the medium power plant systems of FIG. 1 and of FIG. 2.

FIG. 5 shows schematically the fluid conduits involved in the heat exchange relationship at the turbine outlets of each of the turbines of the medium and low power plant systems.

FIG. 6 shows schematically the fluid conduits involved in the heat exchange relationship at the turbine inlets of each of the turbines of the medium power plant systems of FIG. 1 and 2.

FIG. 7 shows schematically the fluid conduits involved in the heat exchange relationships used in the medium and low power plant systems.

FIG. 8 shows schematically a side view of the turbines used in the low power plant systems and the medium power plant systems of FIG. 3 and FIG. 11.

FIG. 9 shows schematically the interior of the turbines of the medium and low power plant systems of the four turbine power plants.

Before explaining the disclosed embodiment of the present invention in detail, it is to be understood that the present invention is not limited in its application to the details of the particular arrangement shown, since the invention is capable of other embodiments. Also the terminology used herein is for the purpose of description and not of limitation.

DETAILED DESCRIPTION

Figure 1:
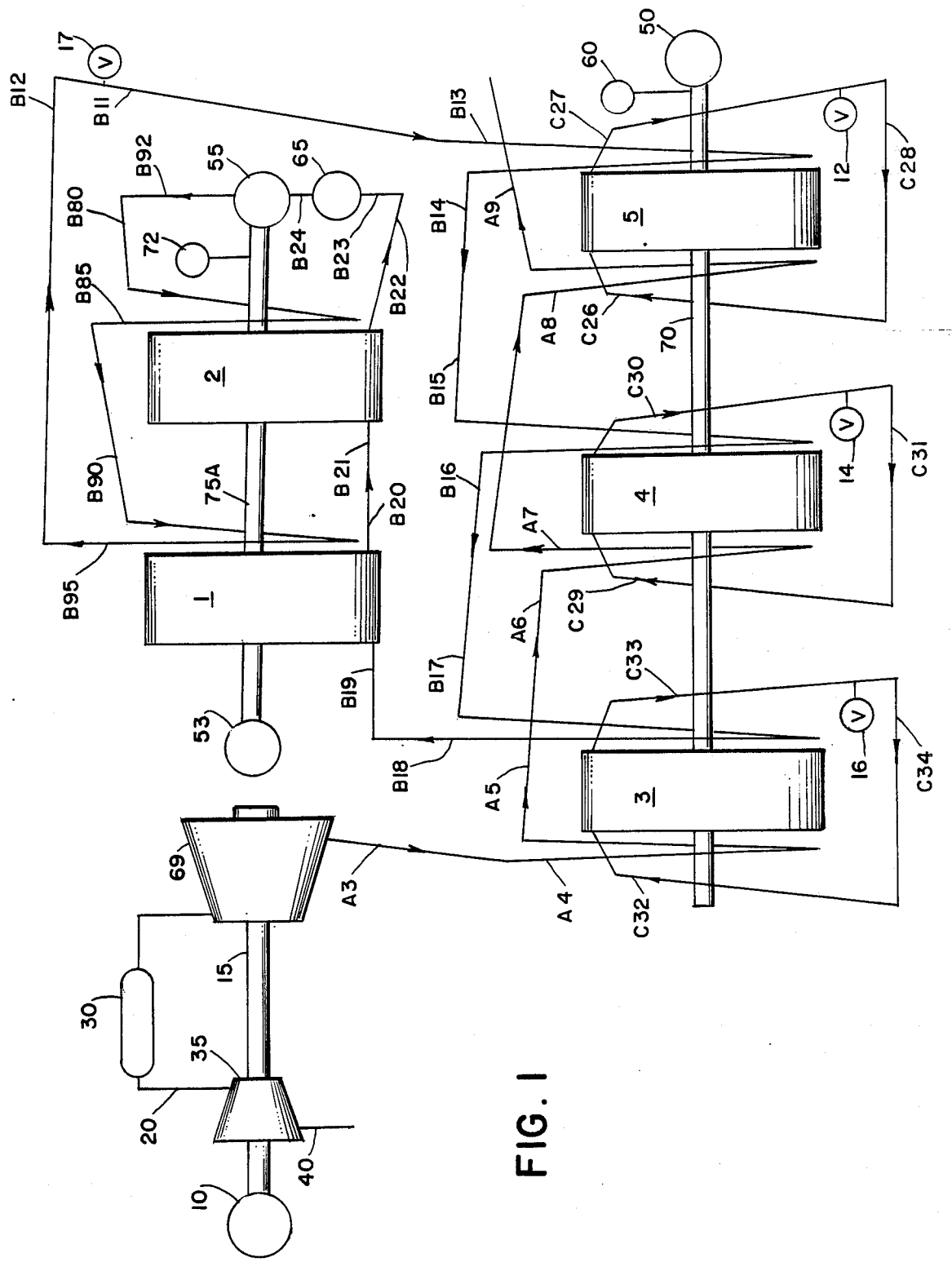
FIG. 1 shows schematically the gas turbine power plant consisting of a conventional gas turbine power plant system, a medium power plant system with individual closed loops and a low power plant closed loop system.

FIG. 1 represents a turbine power plant having a gas turbine system, a medium power plant system with individual closed loops and a low power plant closed loop system.

Referring to FIG. 1, the gas turbine system consists of gas turbine 69, compressor 35 and generator 10, all mounted on common shaft 15. Working fluid enters conduit 40, flows through compressor 35 and combustion chamber 30 before entering gas turbine 69. Both power plants described in the following paragraphs receive the heat energy needed to operate from the hot exhaust fluid of gas turbine 69.

The medium power plant system with individual closed loops may consist of a plurality of N turbines (where N is a whole number greater than one), each having an individual closed loop cycle. In FIG. 1, turbines 3, 4 and 5 are mounted on a common shaft 70 along with generator 50 and starter 60. The hot exhaust fluid, in a gaseous phase, from gas turbine 69 flows through conduit A3 to conduit A4. As the working fluid flows from conduit A4 to conduit A5, heat energy is transferred to turbine 3 by a heat exchange relationship. The hot exhaust fluid from gas turbine 69, having given up a portion of its heat energy to turbine 3, now flows through conduit A6 to conduit A7 where some heat energy is transferred to turbine 4 through a heat exchange relationship. The hot working fluid, in gaseous form, then flows through conduit A8 to A9 where heat energy is transferred through a heat exchange relationship to turbine 5. Therefore, the heat energy required to operate turbines 3, 4 and 5 is obtained from the hot exhaust fluid of gas turbine 69. The heat energy is converted to mechanical energy by turbines 3, 4 and 5 and collected by generator 50. The working fluid in conduit A9 may be released into the environment or may be connected to another power plant system.

The low power plant closed loop system may consist of a plurality of N turbines. In FIG. 1, turbines 1 and 2 are mounted on shaft 75A along with generator 53, starter 72 and pump 55. Pump 55 is used to circulate working fluid through a closed loop cycle. The closed loop cycle begins when pressurized working fluid flows from the outlet of pump 55 to conduit B92 in a liquid phase. The working fluid then flows from conduit B80 to conduit B85 where it absorbs heat energy from the exhaust fluid of turbine 2 through a heat exchange relationship. The working fluid then flows from conduit B90 to conduit B95 where it absorbs heat energy from the exhaust fluid of turbine 1 through a heat exchange relationship. This preheated working fluid now flows through conduits B12 and B11 to conduit B13. The working fluid then flows from conduit B13 to conduit B14 where it absorbs heat energy from the exhaust fluid of turbine 5 through a heat exchange relationship. The working fluid now flows from conduit B15 to conduit B16 repeating the same process and absorbing heat energy from the exhaust fluid of turbine 4. The working fluid then flows from conduit B17 to conduit B18 where additional heat energy is absorbed from the exhaust fluid of turbine 3 through a heat exchange relationship.

The working fluid, which has been preheated by the exhaust fluid of turbines 1 and 2 of the low power plant closed loop system and turbines 3, 4 and 5 of the medium power plant system with individual closed loops, flows from conduit B19 to the inlet of turbine 1. The working fluid then flows from the outlet of turbine 1 through conduit B20 and conduit B21 to the inlet of turbine 2. The working fluid then flows from the outlet of turbine 2 through conduit B22 and conduit B23 to condenser 65 where the working fluid is converted to a liquid phase. The working fluid then flows through conduit B24 to the inlet of pump 55. This represents a complete cycle of the aforementioned closed loop cycle.

In the low power plant closed loop system, the outlet of turbine 1 is connected to conduit B20. The working fluid in conduit B20 is cooled through a heat exchange relationship by the cold working fluid in conduit B90. The outlet of turbine 2 is connected to conduit B22. The working fluid in conduit B22 is cooled through a heat exchange relationship by the cold working fluid in conduit B80. The heat energy required to operate turbines 1 and 2 is absorbed from the hot exhaust fluid of turbines 3, 4 and 5 of the medium power plant system with individual closed loops.

In the medium power plant system with individual closed loops, turbines 3, 4 and 5 each have individual closed loop cycles in which conduits C26, C29 and C32 are connected to the inlets of turbines 5, 4 and 3, respectively. The working fluid in conduits C26, C29 and C32 receive heat energy from the hot working fluid in conduits A8, A6 and A4, respectively, through a heat exchange relationship. The outlets of turbines 5, 4 and 3 are connected to conduits C27, C30 and C33, respectively. The working fluid flowing in conduits C27, C30 and C33 is cooled through a heat exchange relationship by the cold working fluid in conduits B13, B15 and B17, respectively. The working fluid flows from conduits C27, C30 and C33 to conduits C28, C31 and C34, respectively, and back to the inlets of their respective turbine. This represents the complete cycles of the individual closed loops of the medium power plant system.

The medium power plant system with individual closed loops also consists of valves 16, 14 and 12 which are connected to conduits C34, C31 and C28, respectively. These valves are used to vent excessive fluid pressure or to add fluid pressure to the individual closed loops, as needed, from an external source (not shown). Each of the individual closed loops operate with working fluid in a gaseous form.

Figure 2:
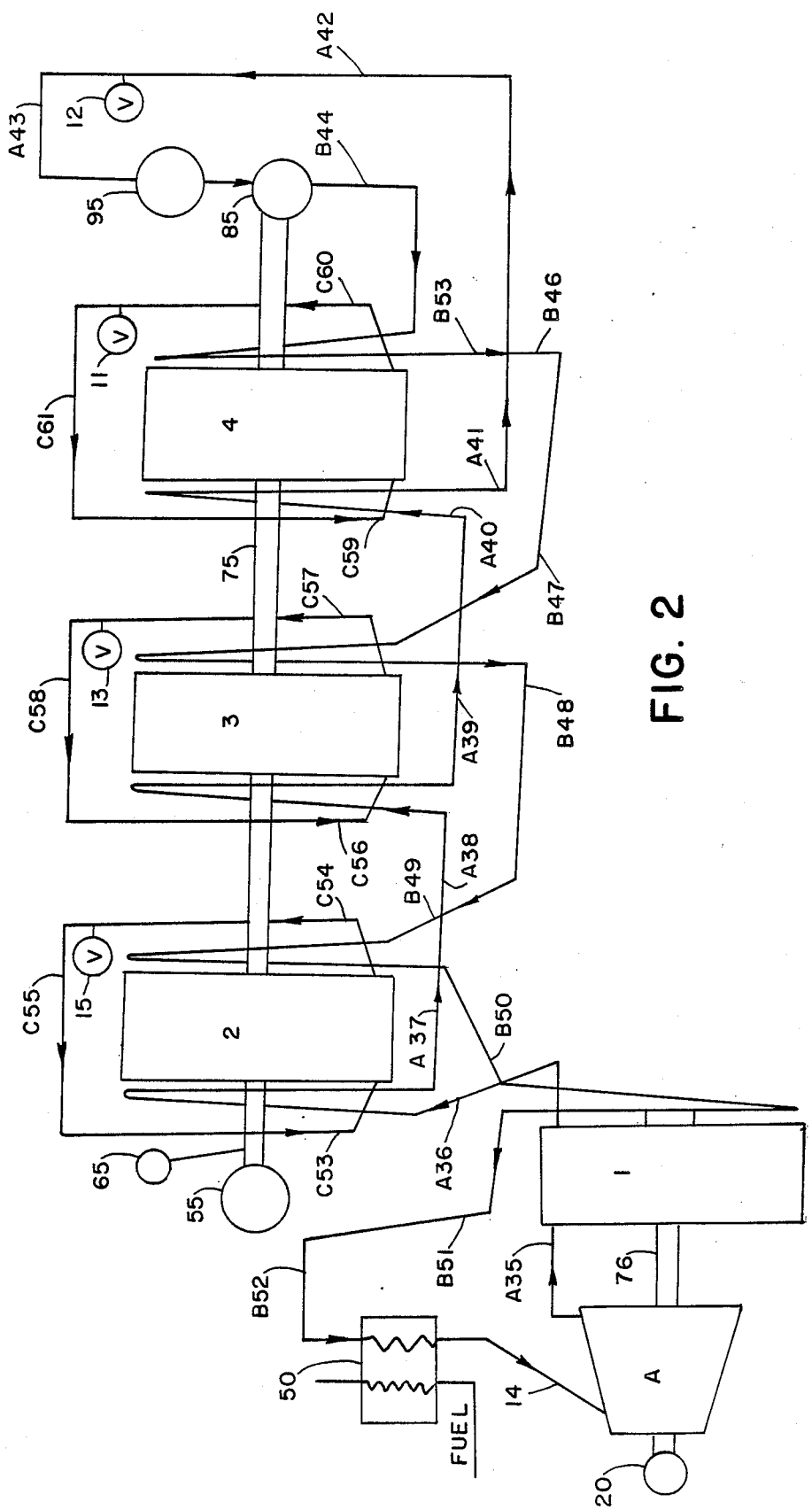
FIG. 2 shows schematically the steam turbine power plant consisting of a closed loop steam turbine system and a medium power plant closed loops system.

FIG. 2 shows the medium power plant system which has a conventional steam turbine system and a medium power plant closed loops system. The conventional steam turbine system is in a heat exchange relationship with the medium power plant closed loops system which operates in a similar manner as the system described in FIG. 1. The medium power plant closed loops system may consist of a plurality of N turbines (where N is a whole number greater than one), each turbine having an individual closed loop cycle.

Referring to FIG. 2, the medium power plant system consists of turbine A, turbine 1 and generator 20 all mounted on common shaft 76. The working fluid enters heater 50 which uses an external fuel source to "superheat" the working fluid which then flows through conduit 14 to steam turbine A where mechanical energy is produced by steam turbine A and collected by generator 20. The hot exhaust fluid from steam turbine A flows through conduit A35 and enters turbine 1. The hot exhaust fluid flows from the outlet of turbine 1 to conduit A36. As the hot exhaust fluid from turbine 1 flows between conduits A36 and A37, conduits A38 and A39 and conduits A40 and A41, heat energy is transferred to turbines 2, 3 and 4, respectively, through a heat exchange relationship.

Turbines 2, 3 and 4 are mounted on common shaft 75 along with generator 55, starter 65 and pump 85. Any number of turbines may be attached to shaft 75 as the need dictates.

The working fluid which has now given up most of its heat energy now flows through conduits A42 and A43 to condenser 95 where any remaining heat energy is removed and the working fluid is condensed to a liquid phase. The working fluid then flows through pump 85, which is used to circulate the fluid through the closed loop system. The working fluid leaves pump 85 and flows through conduit B44 to conduit B53.

As the working fluid flows between conduits B53 and B46, conduits B47 and B48, conduits B49 and B50 and conduits B50 and B51, the working fluid receives heat energy from the exhausts of turbines 4, 3, 2 and 1, respectively, through a heat exchange relationship. The working fluid which has been preheated by the hot exhaust fluid of turbines 4, 3, 2 and 1 now flows through conduit B52 to the inlet of heater 50 where additional heat energy is added.

Turbines 2, 3 and 4 each have individual closed loop cycles in which conduits C53, C56 and C59 are connected to the inlets of turbines 2, 3 and 4, respectively. The working fluid in conduits C53, C56 and C59 receive heat energy from the hot working fluid in conduits A36, A38 and A40, respectively, through a heat exchange relationship. The outlets of turbines 2, 3 and 4 are connected to conduits C54, C57 and C60, respectively. The working fluid flowing in conduits C54, C57 and C60 is cooled through a heat exchange relationship by the cold working fluid in conduits B53, B47 and B49, respectively. The working fluid flows from conduits C54, C57 and C60 to conduits C55, C58 and C61, respectively, and back to the inlets of their respective turbines, representing the complete closed loop cycles.

The medium power plant system shown in FIG. 2 also consists of valves 15, 13 and 11 which are connected to conduits C55, C58 and C61, respectively. These valves are used to vent excessive fluid pressure or to add fluid pressure to the individual closed loops, as needed, from an external source (not shown). Each of the individual closed loops operate with working fluid in a gaseous form.

Figure 3:
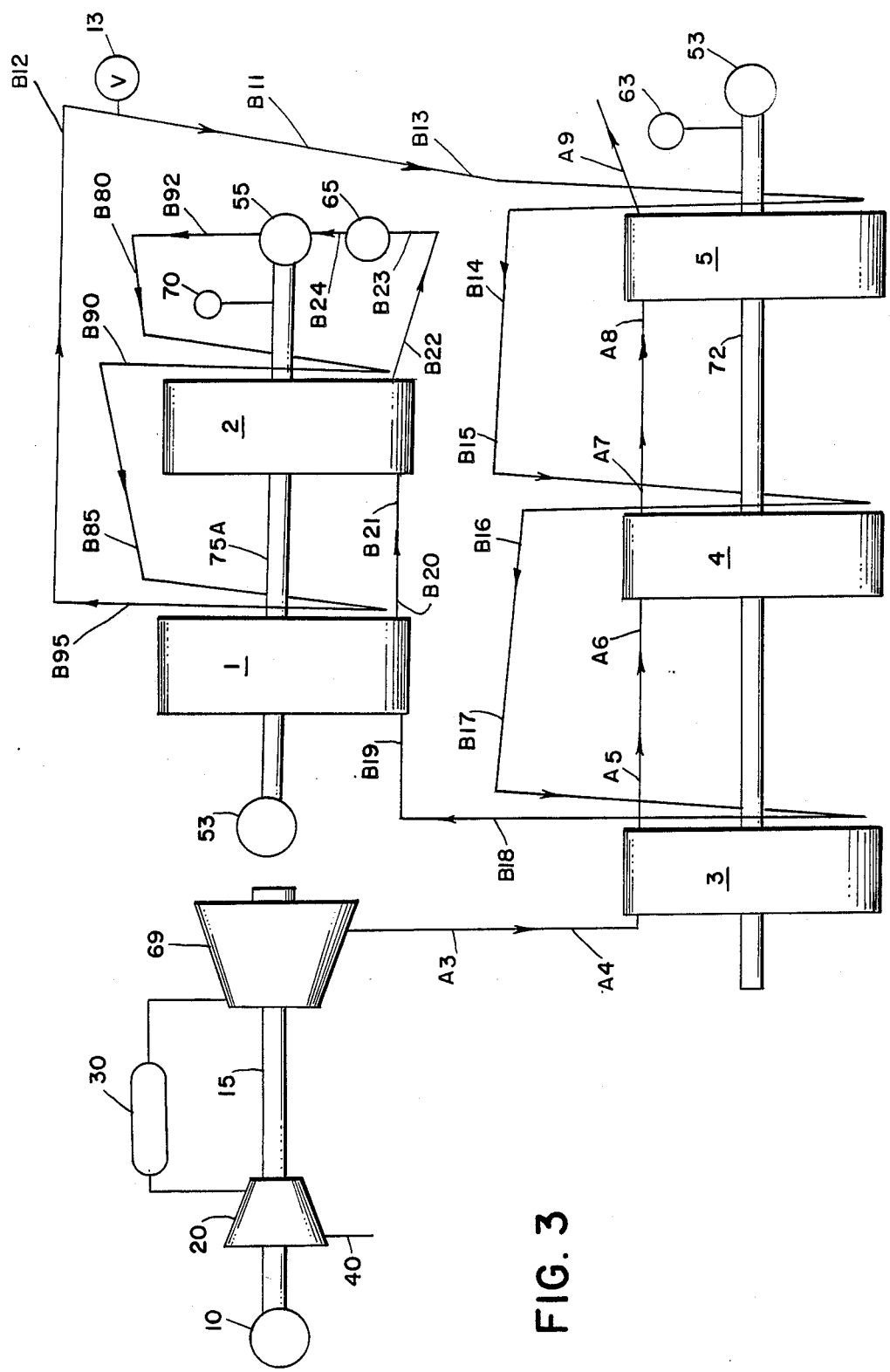
FIG. 3 shows schematically the gas turbine power plant consisting of a conventional gas turbine power plant system, a medium power plant system and a low power plant closed loop system.

FIG. 3 represents a turbine power plant system having a gas turbine system, a medium power plant system and a low power plant closed loop system.

Referring to FIG. 3, the gas turbine system consists of gas turbine 69, compressor 20 and generator 10, all mounted on common shaft 15. Working fluid enters conduit 40, flows through compressor 20 and combustion chamber 30 before entering gas turbine 69. Both power plants described in the following paragraphs receive the heat energy needed to operate from the hot exhaust fluid of gas turbine 69.

The medium power plant system may consist of a plurality of N turbines (where N is a whole number greater than one).

In FIG. 3, turbines 3, 4 and 5 are mounted on common shaft 72 along with generator 53 and starter 63. The hot exhaust fluid, in a gaseous phase, from gas turbine 69 flows through conduit A3 to conduit A4 and then directly into the inlet of turbine 3. The working fluid then flows from the outlet of turbine 3 through conduits A5 and A6 and then directly into the inlet of turbine 4, from the outlet of turbine 4 through conduits A7 and A8 directly into the inlet of turbine 5 and from the outlet of turbine 5 through conduit A9. Therefore, the heat energy required to operate turbines 3, 4 and 5 is obtained from the hot exhaust of gas turbine 69. The heat energy is converted to mechanical energy by turbines 3, 4 and 5 and collected by generator 53. The working fluid in conduit A9 may be released into the environment or may be connected to another power system.

The low power plant closed loop system may consist of a plurality of N turbines. In FIG. 3, turbines 1 and 2 are mounted on shaft 75A along with generator 53, starter 70 and pump 55. Pump 55 is used to circulate working fluid through the closed loop cycle. The closed loop cycle begins when pressurized working fluid flows from the outlet of pump 55 to conduit B92 in a liquid phase. The working fluid then flows from conduit B80 to conduit B90 where it absorbs heat energy from the hot exhaust fluid of turbine 2 through a heat exchange relationship.

The heat exchange relationship can best be described by referring to FIG. 8. In FIG. 8, the outlet side of turbine 20A shows conduit 75A which contains the hot exhaust fluid of turbine 20A. Conduit 700 contains the cool fluid coming from a condenser of the low power plant system. As the fluid in conduits 75A and 700 flow in the same direction from point C to point D (the fluid in conduit 700 may also flow in the opposite direction from point D to point C), the cool fluid in conduit 700 receives heat energy from the hot exhaust fluid of turbine 20A flowing in conduit 75A. This heat energy is used to preheat the fluid flowing to the turbine inlets of the low power plant closed loop system. Conduit 75A "tapers out", increasing in size, from point C to point D and it cools the working fluid, which leaves the blades continuously, as it flows from point C to point D. Number 700 represents the inlet and number 700a represents the outlet of the same conduit.

Referring back to FIG. 3, the working fluid then flows from conduit B85 to conduit B95 where it absorbs heat energy from the exhaust fluid of turbine 1 through a heat exchange relationship (see above description of FIG. 8). This preheated working fluid now flows through conduits B12 and B11 to conduit B13. The working fluid then flows from conduit B13 to conduit B14 where it absorbs heat energy from the exhaust fluid of turbine 5 through a heat exchange relationship (see above description of FIG. 8). The working fluid now flows from conduit B15 to conduit B16 repeating the same process and absorbing heat energy from the exhaust fluid of turbine 4 (see above description of FIG. 8). The working fluid then flows from conduit B17 to conduit B18 where additional heat energy is absorbed from the exhaust fluid of turbine 3 through a heat exchange relationship (see above description of FIG. 8). The working fluid, which has been preheated by the exhaust fluid of turbines 1 and 2 of the low power plant closed loop system and turbines 3, 4 and 5 of the medium power plant system flows from conduit B19 to the inlet of turbine 1. The working fluid then flows from the outlet of turbine 1 through conduit B20 and conduit B21 to the inlet of turbine 2. The working fluid then flows from the outlet of turbine 2 through conduit B22 and B23 to condenser 65 where the working fluid is converted to a liquid phase. The working fluid then flows through conduit B24 to the inlet of pump 55. This represents a complete cycle of the aforementioned closed loop cycle.

In the low power plant closed loop system, the outlet of turbine 1 is connected to B20. The working fluid in conduit B20 is cooled through a heat exchange relationship by the cold working fluid in conduit B85 (see above description of FIG. 8). The outlet of turbine 2 is connected to conduit B22. The working fluid in conduit B22 is cooled through a heat exchange relationship by the cold working fluid in conduit B80 (see above description of FIG. 8). The heat energy required to operate turbines 1 and 2 is absorbed from the hot exhaust fluid of turbines 3, 4 and 5 of the medium power plant system and the hot exhaust fluid of turbines 1 and 2.

FIG. 3 represents the same gas turbine power plant as FIG. 1 with the exception that the medium power plant system of FIG. 3 does not have individual closed loops. The hot exhaust fluid from gas turbine 69 flows through conduit A3 to conduit A4 and then directly into the inlet of turbine 3. The working fluid then flows from the outlet of turbine 3 through conduits A5 and A6 and directly into the inlet of turbine 4, from the outlet of turbine 4 through conduits A7 and A8 directly into the inlet of turbine 5 and from the outlet of turbine 5 through conduit A9 to a point where the working fluid is released into the environment. Valve 13 is connected to conduit B11 and is used to vent excessive fluid pressure or add fluid pressure to the gas turbine power plant from an external source (not shown). The rest of the gas turbine power plant represented by FIG. 3 is identical to FIG. 1.

Referring to FIG. 1, valve 17 is connected to conduit B12 and referring to FIG. 2, valve 12 is connected to conduit A43. These valves are used to vent excessive fluid pressure or add fluid pressure to the turbine power plants from an external source (not shown).

FIG. 4 shows schematically a side view of each of the plurality of N turbines used in the medium power plant systems of FIG. 1 and of FIG. 2. The turbines have an apparatus that allows a heat exchange relationship at both the turbine inlet and the turbine outlet. Each of the turbines has an individual closed loop cycle, therefore only heat energy is exchanged, the working fluids of the separate systems do not mix.

FIG. 6 shows schematically a side view of the apparatus (fluid conduits) that allow the heat exchange relationship at the turbine inlet referred to in FIG. 4. Number 70 represents the inlet and number A70 represents the outlet of the same conduit. As hot exhaust fluid flows through conduit 70 and the working fluid of the turbine flows in the same direction in conduit 75, the heat exchange process occurs. Heat energy is transferred from point 6 to point 5. Conduits 75, 70 and A70 in FIG. 6 refer to conduits 75, 70 and A70 in FIG. 4, respectively.

Referring to the inlet side of turbine 20 in FIG. 4, conduit 75 contains the working fluid which enters turbine 20. Conduit 70 contains the hot exhaust fluid from the conventional gas turbine system (if referring to FIG. 1) or the hot exhaust fluid from the closed loop steam turbine system (if referring to FIG. 2). As the fluid in conduits 70 and 75 flows in the same direction, from point A t point B (the fluid in conduit 70 may also flow in the opposite direction from point B to point A), heat energy is transferred from circuit 70 to conduit 75. This heat energy is used to drive turbine 20. Conduit 75 "tapers in" decreasing in size from point A to point B and it distributes heat energy to all the rotor blades of turbine 20, hitting all the blades continuously, as it flows from point A to point B. Number 70 represents the inlet and A70 represents the outlet of the same conduit.

FIG. 5 shows schematically a side view of the apparatus (fluid conduits) that allow the heat exchange relationship at the turbine outlet referred to in FIG. 4. As cold working fluid flows through conduit 700A and hot exhaust fluid of the turbine flows through conduit 75A, the heat exchange process occurs. Heat energy is transferred from point 40 to point 35A. Conduits 700A, 75A and 700 in FIG. 5 refer to conduits 700A, 75A and 700 in FIG. 4, respectively.

Referring to the outlet side of turbine 20 in FIG. 4, conduit 75A contains the hot exhaust fluid of turbine 20. Conduit 700 contains the cool fluid coming from a condenser of the low power plant closed loop system (if refering to FIG. 1) or the cool fluid coming from a condenser of the closed loop steam turbine system (if referring to FIG. 2). As the fluid in conduits 75A and 700 flow in the same direction from point C to point D (the fluid in conduit 700 may also flow in in the opposite direction from point D to point C), the cool fluid in conduit 700 receives heat energy from the hot exhaust fluid of turbine 20 flowing in conduit 75A. This heat energy is used to preheat the fluid flowing to the turbine inlets of the low power plant closed loop system (if refering to FIG. 1) or to preheat the fluid flowing to the heater of the closed loop steam turbine system (if referring to FIG. 2). Conduit 75A "tapers out", increasing in size from point C to point D and it cools the working fluid, which leaves the blades continuously, as it flows from point C to point D. Number 700 represents the inlet and number 700A represents the outlet of the same conduit.

FIG. 7 schematically shows another possible heat exchange process. As hot exhaust fluid flows through conduit A10 and the working fluid of the turbine flows in the same direction, through conduit A20, heat energy is transferred from conduit A10 to conduit A20. B10 is the outlet of conduit A10. B20 is the outlet of conduit A20 and flows to the inlet of the turbine. The hot exhaust may flow in the opposite direction from B10 to A10.

FIG. 8 shows schematically a side view of each of the plurality of N turbines used in the medium power plant system of FIG. 3 and 11, and the low power plant systems of FIG. 1 and FIG. 3. The turbines have an apparatus that allows a heat exchange relationship at the turbine outlets, but not at the turbine inlets as shown in FIG. 4. Heat energy is exchanged only at the turbine outlets, not the turbine inlets.

Referring to the inlet side of turbine 20A in FIG. 8, conduit 75 contains the hot exhaust fluid from the conventional gas or steam turbines (if FIG. 3 and 11) or the hot exhaust fluid from the medium power plant systems (if referring to FIG. 1 and FIG. 3). Conduit 75 "tapers in", decreasing in size from point A to point B and distributes heat energy to all the rotor blades continuously, as it flows from point A to point B.

The outlet side of turbine 20A in FIG. 8 operates in the same manner as the outlet side of turbine 20 in FIG. 4.

FIG. 9 shows schematically the interior of turbine 20 in FIG. 4. Blades B have the same diameter as point C in FIG. 6 and point G in FIG. 5.

Figure 10:
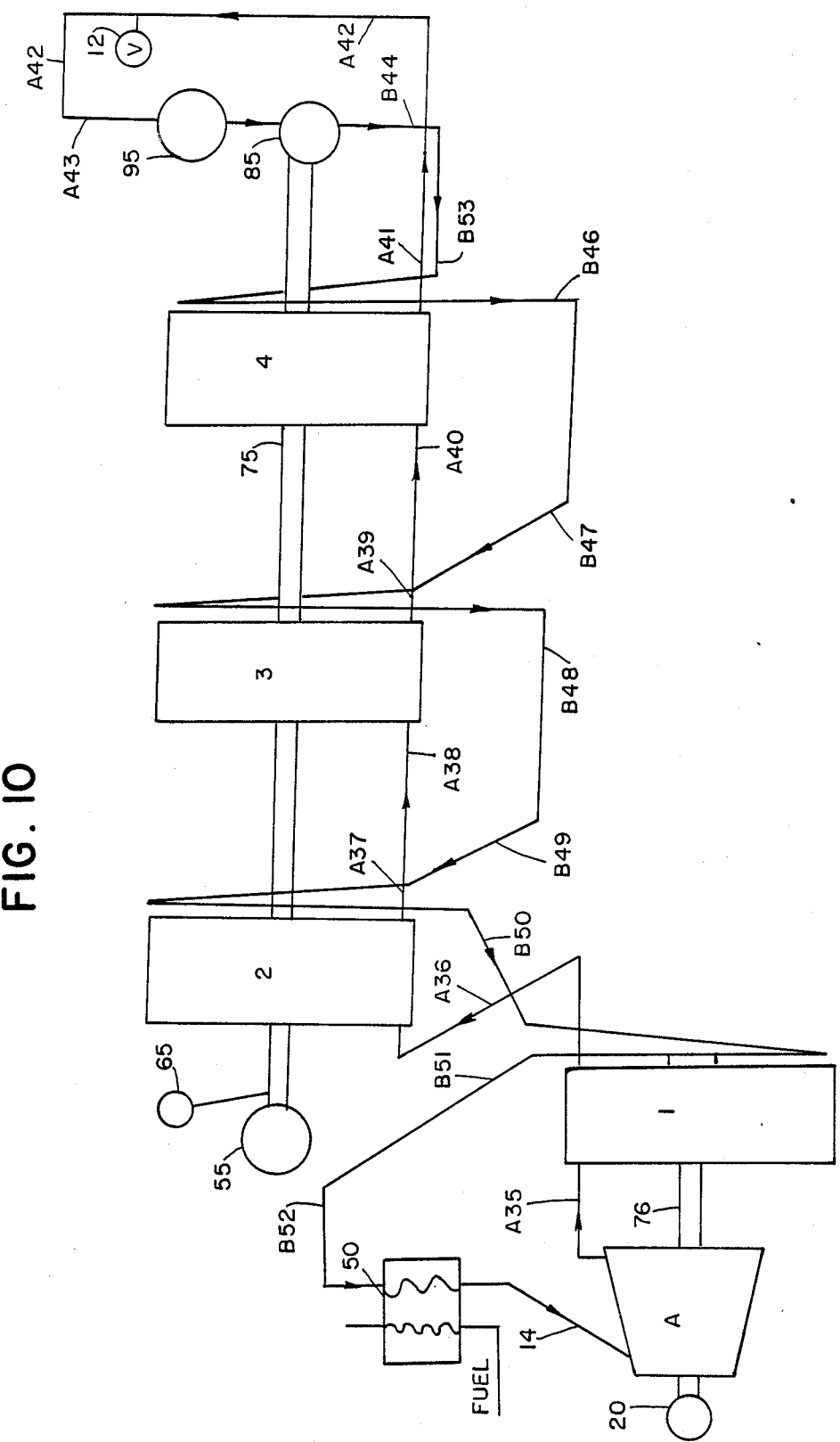
FIG. 10 shows schematically the steam turbine power plant consisting of a closed loop steam turbine system and a medium power plant system.

FIG. 10 represents the same steam turbine power plant as FIG. 2 with the exception that the medium power plant system of FIG. 10 does not have individual closed loops. The hot exhaust fluid from the outlet of steam turbine 1 flows through conduit A36 directly into the inlet of turbine 2. The working fluid then flows from the outlet of turbine 2 through conduit A37 directly into the inlet of turbine 3, from the outlet of turbine 3 through conduit A39 directly into the inlet of turbine 4 and from the outlet of turbine 4 to the inlet of condenser 95. Valve 12 is connected to conduit A42 and is used to vent excessive fluid pressure or add fluid pressure to the steam turbine power plant from an external source (not shown). The rest of the steam turbine power plant represented by FIG. 10 is identical to FIG. 2.

Referring to FIG. 1, FIG. 2, FIG. 3 and FIG. 10, the power from the starter is used to start each of the plurality of N turbines. The turbines are designed to pull the working fluid in at the turbine inlet, push the working fluid out at the turbine outlet and circulate the working fluid in the systems. The working fluid used by the turbines is in gaseous form. Heat energy is added to the working fluid before it flows to the turbine inlet. At the turbine outlet, a pressure drop occurs as the turbine exhaust fluid is cooled by cold working fluid coming from a condenser. Therefore the pressure at the turbine inlet is greater than at the turbine outlet.

I claim:

1. In a gas turbine power plant having a conventional gas turbine system, a medium power plant system which partially consists of a plurality of N turbines, where N is a whole number greater than one, each having a fluid inlet and a fluid outlet and a low power plant closed loop system;

a conventional gas turbine system which comprises the combination of:

a gas turbine having a fluid inlet and a fluid outlet mounted on a first shaft;

a compressor having a fluid inlet and a fluid outlet and a compressing means between its inlet and outlet, said compressor operatively connected to said first shaft;

a generator means operatively connected to said first shaft;

a combustion chamber having a fluid inlet and fluid outlet and a combusting means between its inlet and outlet;

a fluid conduit means operatively connecting the following in an open loop cycle, the environment to the inlet of said compressor, the outlet of said compressor to the inlet of said combustion chamber, the outlet of said combustion chamber to the inlet of said gas turbine, the outlet of said gas turbine to the inlet of the first of the plurality of N turbines of the medium power plant system, said fluid conduit then connecting the outlets of each of said plurality of N turbines of the medium power plant system to the inlet of the next of said plurality of N turbines of the medium power plant system and the outlet of the last of said plurality of N turbines of the medium power plant system to the environment;

a medium power plant system which comprises the combination of:

said plurality of N turbines, where N is a whole number greater than one, each having a fluid inlet and a fluid outlet and each mounted on a second shaft;

a generator means operatively connected to said second shaft;

a starter means operatively connected to said second shaft;

each of said plurality of N turbines of the medium power plant system is designed to receive heat energy to operate from the exhaust energy of said gas turbine;

a low power plant closed loop system which comprises the combination of:

a plurality of N turbines each having a fluid inlet and a fluid outlet and each mounted on a third shaft;

a generator means operatively connected to said third shaft;

a starter means operatively connected to said third shaft;

a pump having a fluid inlet and a fluid outlet and a pressurizing and circulating means between its inlet and outlet said pump operatively connected to said third shaft;

a condenser having a fluid inlet and a fluid outlet and a condensing means between its inlet and outlet;

a fluid conduit means operatively connecting the following in a closed loop, the outlet of said pump to the inlet of the first of the said plurality of N turbines of the low power plant closed loop system, the outlets of each of the said plurality of N turbines of the low power plant closed loop system to the inlet of the next of said plurality of N turbines of the low power plant closed loop system, the outlet of the last of said plurality of N turbines of the low power plant closed loop system to the inlet of said condenser, the outlet of said condenser to the inlet of said pump;

said fluid conduit means operatively connecting the outlet of said pump to the inlet of the first of said plurality of N turbines of the low power plant closed loop system is designed to first pass by and receive exhaust heat energy from the outlet of each of said plurality of N turbines of the low power plant closed loop system and second pass by and receive exhaust heat energy from the outlets of each of said plurality of N turbines of the medium power plant system, both through the use of a heat exchange relationship therefore preheating the working fluid which is used to operate the turbines of the low power plant closed loop system, as heat energy is received from the outlets of said turbines a pressure drop occurs at the outlets of said turbines.

2. A gas turbine power plant according to claim 1 in which an external energy source is used to drive said conventional gas turbine system and the exhaust heat energy of said conventional gas turbine system is used to drive said medium power plant system and the exhaust heat energy of said medium power plant system and said low power plant closed loop system is used to drive said low power plant closed loop system.

3. A gas turbine power plant according to claim 1 in which the turbine blades in the rotor passageway of said turbines of the medium power plant system and said turbines of the low power plant closed loop system are set at an angle which allows the blades to pull in fluid at the turbine inlet and push out the fluid at the turbine outlet.

4. A gas turbine power plant according to claim 1 in which each of said turbines of the medium power plant system and each of said turbines of the low power plant closed loop system are designed to allow a heat exchange relationship between the medium power plant system and the low power plant closed loop system, the heat exchange relationship occuring at each of said turbine outlets.

5. A gas turbine power plant according to claim 1 in which each of said turbines of the medium power plant system and each of the turbines of the low power plant closed loop system having a fluid conduit which passes outside the rotor blades "tapering in", decreasing in size, at the turbine inlet.

6. A gas turbine power plant according to claim 1 in which each of said turbines of the medium power plant system and each of the turbines of the low power plant closed loop system having a fluid conduit which passes outside the rotor blades "tapering out", increasing in size, at the turbine outlet.

7. A gas turbine power plant according to claim 1 in which each of said turbines of the medium power plant system and each of the turbines of the low power plant closed loop system are designed to allow working fluid to enter the rotor blades continuously, hitting all the rotor blades continuously and leave the rotor blades continuously as the working fluid flows from the turbine inlet to the turbine outlet.

8. In a gas turbine power plant according to claim 1 in which each of said turbines of the medium power plant system and each of said turbines of the low power plant closed loop system have a fluid conduit which passes outside the rotor blades "tapering out" (increasing in size) at the turbine outlet, said fluid conduit is attached to said fluid conduit means operatively connecting the outlet of said pump to the inlet of the first of said plurality of N turbines of the low power plant closed loop system in a heat exchange relationship which provides heat energy to each of said turbines of the low power plant closed loop system.

* * * * *